US007545920B2

(12) United States Patent
Wilson et al.

(10) Patent No.: US 7,545,920 B2
(45) Date of Patent: Jun. 9, 2009

(54) CALL REPORTING

(75) Inventors: Denise K. Wilson, Hoffman Estates, IL (US); Mark T. Korecki, Chicago, IL (US); Mark P. Levell, Chicago, IL (US); Sarah R. Crozier, Downers Grove, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 894 days.

(21) Appl. No.: 11/080,057

(22) Filed: Mar. 15, 2005

(65) Prior Publication Data

US 2006/0115061 A1 Jun. 1, 2006

Related U.S. Application Data

(60) Provisional application No. 60/632,493, filed on Nov. 30, 2004.

(51) Int. Cl.
*H04M 15/00* (2006.01)
(52) U.S. Cl. .............................. 379/112.01; 379/112.08; 379/133; 379/135; 379/139; 379/140
(58) Field of Classification Search ................ 379/111, 379/112.01, 112.06, 112.08, 114.01, 114.08, 379/114.13, 114.28, 133, 134, 137, 138, 379/139, 140
See application file for complete search history.

(56) References Cited

U.S. PATENT DOCUMENTS

| 5,636,346 | A | * | 6/1997 | Saxe ............................. 705/1 |
| 5,740,234 | A | * | 4/1998 | Black et al. ............. 379/112.01 |
| 5,799,073 | A | * | 8/1998 | Fleischer et al. ........ 379/112.01 |
| 5,867,494 | A | | 2/1999 | Krishnaswamy et al. |
| 5,903,635 | A | * | 5/1999 | Kaplan .................. 379/112.01 |
| 6,470,079 | B1 | * | 10/2002 | Benson .................. 379/114.13 |
| 6,529,594 | B1 | | 3/2003 | Brockman et al. |
| 6,567,511 | B2 | | 5/2003 | Betts et al. |
| 6,614,781 | B1 | | 9/2003 | Elliott et al. |
| 6,636,504 | B1 | | 10/2003 | Albers et al. |
| 6,721,405 | B1 | | 4/2004 | Nolting et al. |
| 6,744,866 | B1 | | 6/2004 | Nolting et al. |
| 6,775,267 | B1 | | 8/2004 | Kung et al. |
| 6,792,089 | B2 | | 9/2004 | Tiliks et al. |
| 2001/0012345 | A1 | * | 8/2001 | Nolting et al. ......... 379/112.01 |

OTHER PUBLICATIONS

Cisco Unified Communications Manager Call Detail Records Administration Guide, Types of Call Information Records, www.cisco.com, obtained from the Internet on Mar. 12, 2009, 6 pages.
Wikipedia, Call Detail Record, www.wikipedia.org, obtained from the Internet on Mar. 12, 2009, 2 pages.

* cited by examiner

*Primary Examiner*—Binh K Tieu
(74) *Attorney, Agent, or Firm*—Hanley, Flight & Zimmerman, LLC.

(57) ABSTRACT

A technique for near real-time reporting of telephone number usage to a computer is disclosed. According to the technique, signaling protocol data is collected for telephone calls that involve telephone numbers associated with the user. The signaling protocol data is decoded and call information records (CIRs) are generated from the decoded signaling data. The CIRs contain information about calls associated with the telephone numbers. The CIRs are used to generate a report which is made available to the user.

26 Claims, 16 Drawing Sheets

300 ↘

| START TIME 320 | END TIME 330 | CALLING NUMBER 340 | CALLED NUMBER 350 | CALL COMPLETION STATUS 360 | CALL DISPOSITION 370 |
|---|---|---|---|---|---|

| USERNAME 420 | PASSWORD 430 | CUSTOMER IDENTIFICATION 440 | AUTHORIZATION LEVEL 450 |
|---|---|---|---|

FIG. 4

REPORT PARAMETERS ~606

Customer Identification ~601
Company        Big TEX Oil
Branch         None                  Timeframe ~603
Department     None                  Start Time    04/01/2004
                                     End Time      04/01/2004

Telephone Number Filters ~602        Call Completion Filter ~604
Called Number   All numbers          Completion    All Calls
Calling Number                       Status
Schedule Report:                     Generate Report: (Web) (Exel) ~605

Next 25 rows

Call View Detail Report ~609

| Originating City↑ | State↑ | Called Number | Calling Number↓ | Start Date and Time↑ | Completion Status↑ | Call Disposition↑ | Duration |
|---|---|---|---|---|---|---|---|
| Mission | Texas | (866) 687-8140 | (956) 458-9002 | 04/01/2004 23:33:03 | C | Call Completed | 00:00:16 |
| Westace | Texas | (866) 687-8140 | (956) 472-5752 | 04/01/2004 23:20:45 | C | Call Completed | 00:00:05 |
| Edinburg | Texas | (866) 687-8140 | (956) 207-2024 | 04/01/2004 22:52:45 | C | Call Completed | 00:00:07 |
| Harlingen | Texas | (866) 687-8140 | (956) 536-1924 | 04/01/2004 22:40:16 | C | Call Completed | 00:00:06 |
| Harlingen | Texas | (866) 687-8140 | (956) 536-1924 | 04/01/2004 22:39:44 | C | Call Completed | 00:00:16 |
| Pharr | Texas | (866) 687-8140 | (956) 460-0752 | 04/01/2004 22:37:58 | C | Call Completed | 00:00:08 |
| Mission | Texas | (866) 687-8140 | (956) 456-7365 | 04/01/2004 22:19:48 | C | Call Completed | 00:00:09 |
| Harlingen | Texas | (866) 687-8140 | (956) 454-8059 | 04/01/2004 22:05:23 | C | Call Completed | 00:00:06 |
| Baton Rouge | Louisiana | (866) 687-8140 | (225) 343-2036 | 04/01/2004 21:58:27 | C | Call Completed | 00:00:09 |
| Edinburg | Texas | (866) 687-8140 | (956) 457-4503 | 04/01/2004 21:02:55 | C | Call Completed | 00:00:10 |
| Westace | Texas | (866) 687-8140 | (956) 473-2464 | 04/01/2004 20:48:32 | C | Call Completed | 00:00:08 |
| Harlingen | Texas | (866) 687-8140 | (956) 728-0416 | 04/01/2004 20:29:56 | C | Call Completed | 00:00:06 |

REPORT PARAMETERS ~806
Customer Identification ~801
  Company       Big TEX Oil
  Branch        None
  Department    None
Telephone Number Filters ~ 802
  Called Number   All numbers
— Schedule Report: 

Timeframe ~ 803
— Start Time    04/01/2004
  End Time      04/01/2004

Report Summary Granularity Filter ~ 804
— Report Summary   Quarterly
  Level

Generate Report: (Web) (Exel) ~ 805

Call Disposition Summary Report ~ 809

| 810<br>Quarter | 811<br>Total<br>Attempts | 812<br>Completed<br>Attempts | 813<br>Completed<br>Hold<br>Minutes | 814<br>Completed<br>Billed<br>Minutes | 815<br>Incomplete<br>Attempts | 816<br>Incompleted<br>Hold<br>Minutes | 817<br>Percent<br>Completed | 818<br>Total<br>Duration | 819<br>Avg Call<br>Duration | |
|---|---|---|---|---|---|---|---|---|---|---|
| 2Q-2004 | 61,848 | 54,714 | 64:33:33 | 63:58:52 | 7,134 | 12:13:15 | 88.46% | 63:58:52 | 06:58 | } 830 |
| Grandtotal: | 61,848 | 54,714 | 64:33:33 | 63:58:52 | 7,134 | 12:13:15 | 88.46% | 63:58:52 | 06:58 | } 840 |

FIG. 8

REPORT PARAMETERS ~ 1006
  Customer Identification ~ 1001
    Company      Big TEX Oil
    Branch       None
    Department   None
  Telephone Number Filters ~ 1002
    Called Number  (866) 250-2246
  Schedule Report:

Timeframe ~ 1003
    Start Time  04/01/2004
    End Time    04/30/2004

Frequent Caller City Filter ~ 1004
    City Frequency Minimum  5

Generate Report:  Web  Exel ~ 1005

Calling City Statistics Report ~ 1009

| 1010<br>City | 1011<br>State | 1012<br>Unique<br>Callers | 1013<br>Total<br>Calls | 1014<br>Complete<br>Calls | 1015<br>Incomplete<br>Calls | 1016<br>Percentage<br>Complete | 1017<br>Total<br>Duration | 1018<br>Avg Call<br>Duration |
|---|---|---|---|---|---|---|---|---|
| Houston | TX | 199 | 203 | 180 | 23 | 88.66% | 05:50:31 | 01:56 |
| Dallas | TX | 111 | 113 | 91 | 22 | 80.53% | 02:34:58 | 01:42 |
| Austin | TX | 97 | 100 | 85 | 15 | 85.00% | 02:57:58 | 02:05 |
| San Antonio | TX | 69 | 70 | 55 | 15 | 78.57% | 01:50:41 | 02:00 |
| Domestic: | | 476 | 486 | 411 | 75 | 83.26% | 25:16:46 | 01:52 |
| Grand Total: | | 476 | 486 | 411 | 75 | 83.26% | 25:16:46 | 01:52 |

Rows 1–4 braced as 1020; Domestic row braced as 1030; Grand Total row braced as 1040.

FIG. 10

REPORT PARAMETERS ~ 1206
Customer Identification ~ 1201
 Company     Big TEX Oil
 Branch      None
 Department  None
Telephone Number Filters ~ 1202
 Called Number   (800) 687-8140
Schedule Report: 

Elapsed Time Statistics Report ~ 1210
Time Elapse Range ~ 1210
00:00:00 - 00:00:30
00:00:30 - 00:00:60

Timeframe ~ 1203
 Start Time   04/01/2004
 End Time     04/01/2004

Elapsed Time Filter ~ 1204
 Time Elapse Window (sec)  30

Generate Report:  (Web)  (Exel) ~ 1205

Total Calls ~ 1211      Total Duration ~ 1212
78                      00:03:47   ⎫
1                       00:00:51   ⎬ 1220
Grandtotal: 79          00:13:26   ⎭ 1230

FIG. 12

REPORT PARAMETERS ~ 1306
Customer Identification ~ 1301
  Company          Big TEX Oil
  Branch           None
  Department       None
Telephone Number Filters ~ 1302
  Called Number    (866) 317-5809
Schedule Report: 

Timeframe ~ 1303
  Start Time   04/01/2004
  End Time     04/01/2004

Generate Report:  (Web)  (Exel) ~ 1305

Originating Line Statistics Report ~ 1309

| 1310<br>Called Number | 1311<br>Originating Line Indicator | 1312<br>OLI Description | 1313<br>Total Calls | 1314<br>Complete Calls | 1315<br>Incomplete Calls | 1316<br>Percentage Complete | |
|---|---|---|---|---|---|---|---|
| (866) 317-5809 | 00 | POTS | 33 | 30 | 3 | 90.90% | ⎫ 1320 |
| (866) 317-5809 | 27 | Coin Call | 2 | 2 | 0 | 100.00% | |
|  |  | Grandtotal: | 35 | 32 | 3 | 91.42% | ⎫ 1330 |

FIG. 13

REPORT PARAMETERS ~ 1406

Customer Identification ~ 1401
  Company       Big TEX Oil
  Branch        None
  Department    None Telephone Number Filters ~ 1402
  Called Number    All numbers Timeframe ~ 1403
  Start Time    04/01/2004
  End Time      04/01/2004

Caller Attempt Filter ~ 1404
  Retry Window (hrs)         24
  Lost Call Threshold (sec)  30

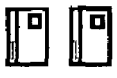

Generate Report:  (Web)  (Exel) ~ 1405

Schedule Report: 

Caller Reattempt Statistics Report ~ 1409

| 1410<br>Call<br>Attempts | 1411<br>Number<br>of Callers | 1412<br>Calls over<br>Threshold | 1413<br>Calls under<br>Threshold | 1414<br>Lost<br>Calls | 1415<br>Cumulative Percent<br>Completed |
|---|---|---|---|---|---|
| 1st | 687 | 570 | 117 | 49 | 83%     ⎫ 1420 |
| 2nd | 68  | 54  | 14  | 4  | 90.8%   ⎫ 1430 |
| 3rd | 10  | 7   | 3   | 1  | 91.8%   ⎫ 1440 |

FIG. 14

REPORT PARAMETERS

Report Delivery Frequency ~ 1601
— Daily   S M T W T F S
          ☐ ☑ ☑ ☑ ☑ ☑ ☐

Report Data Timeframe ~ 1602
— Daily   ⦿ Last Complete Day
          ○ Current Day Report Type ~ 1603   Call Detail Report Report Title ~ 1604   Admins Call View Daily Telephone Number Filters ~ 1605
— Called Number    All numbers
  Calling Number Customer Identification ~ 1606
  Customer     Big Tex Oil
  Branch       None
  Department   None Call Completion Filter ~ 1607
  Completion Status   All Calls Subscription Email ~ 1608
  youremail@mycompany.com Report Visibility ~ 1609   ⦿ Shared   ○ Private Report Format ~ 1610   ⦿ HTML   ○ Excel

[Save] 1620   [Delete] 1621   [Cancel] 1622

FIG. 16

CALL REPORTING

RELATED APPLICATION

This application claims the benefit of U.S. Provisional Application No. 60/632,493 filed on Nov. 30, 2004. The entire teachings of the above application are incorporated herein by reference.

BACKGROUND OF THE INVENTION

The present invention relates to telecommunications and in particular to reporting phone number usage in a telecommunications network.

Modern telecommunications systems have been deployed world-wide, thus enabling users from around the world to easily communicate with each other. Service providers that provide these systems, typically offer their customers a variety of services including, for example, toll free service, mobile service, and traditional residential and business services. Customers are typically assigned one or more telephone numbers which enable them to access the service including placing as well as receiving telephone calls.

Service providers typically bill their customers for these services on either a usage basis or a flat fee basis. With flat fee billing, a customer is typically allowed unlimited access to the service for a fixed flat fee. On the other hand, with usage based billing, a customer is billed for each use of the service. Here, usage may be billed on a call duration basis as well as on a call location basis.

Billing is often performed on a month-to-month basis. Typically, a service provider generates a hard copy billing report after a month's worth of usage and sends the report to the customer. The report usually comprises a list of services used and an amount that is being charged for the services. In addition, usage based billing reports may provide additional detail for each service used including, for example, calling and called phone numbers, locations of the calling and called parties and call duration.

One problem with reporting usage on a monthly basis is that the information may not be timely enough to enable a customer to monitor and react to various trends in their service use. For example, a customer may want to monitor trends in call traffic so that it may be able to efficiently and quickly redeploy resources to handle peaks and valleys in call traffic. Also, for example, a customer may want to monitor call volume associated with various telephone numbers to determine if the numbers are being used improperly and react quickly to mitigate costs.

SUMMARY OF THE INVENTION

The present invention overcomes shortcomings associated with the prior art by incorporating a technique for near real-time reporting of telephone number usage to a computer user. According to the technique, signaling protocol data is collected for telephone calls that involve telephone numbers associated with the user. The signaling protocol data is decoded and call information records (CIRs) are generated from the decoded signaling data. The CIRs contain information about calls associated with the telephone numbers. The CIRs are used to generate a report which is made available to the user.

In the illustrated embodiment, Signaling System 7 (SS7) signaling protocol data associated with toll free telephone numbers are collected from various data switches in a telecommunications network by one or more probes. The probes decode the SS7 data and produce CIRs from the decoded data. The CIRs contain near real-time information about calls associated with the toll free telephone numbers. This information includes the toll free number called, a calling number, a call disposition, a start time and date of the call, an end time and date of the call and a completion status associated with the call. The CIRs are transferred to a server which acquires the CIRs and processes them including filtering the CIRs and storing the filtered CIRs in a database. A user at a web browser logs into the server, selects a report and specifies various parameters to be used to generate the report. Based on the user's selection and specified parameters, the server extracts CIRs from the database and generates the selected report. The server makes the report available to the user by transferring the report to the user's web browser or sending a notification to the user by electronic mail (e-mail).

Advantageously, by providing reports using near real-time data associated with telephone numbers, the inventive technique enables a user to monitor usage of its phone numbers within a short time of a call attempt. In addition, by providing various reports based on the near real-time data, the user, in short order, may monitor trends in telephone number usage, analyze various marketing responses associated with the telephone numbers, recognize lost calls, detect abuse and potential fraud and other potential troubles with the telephone numbers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a schematic block diagram of a call information record (CIR) that may be used with the present invention.

FIG. 4 is a schematic block diagram of a user authentication record that may be used with the present invention.

FIG. 6 is an illustration of a call view detail report that may be used with the present invention.

FIG. 8 is an illustration of a call disposition summary report that may be used with the present invention.

FIG. 10 is an illustration of a calling city statistics report that may be used with the present invention.

FIG. 12 is an illustration of an elapsed time statistics report that may be used with the present invention.

FIG. 13 is an illustration of an originating line statistics report that may be used with the present invention.

FIG. 14 is an illustration of a caller reattempt statistics report that may be used with the present invention.

FIG. 16 is an illustration of an input screen that may be used to create a scheduled report in accordance with the present invention.

DETAILED DESCRIPTION OF THE INVENTION

A description of preferred embodiments of the invention follows. Embodiments of the invention described below describe the present invention as used with toll free numbers. It should be noted, however, the present invention may be adapted to be used with other types of telephone numbers, such as telephone numbers associated with residential, business and wireless services.

Figure 1:
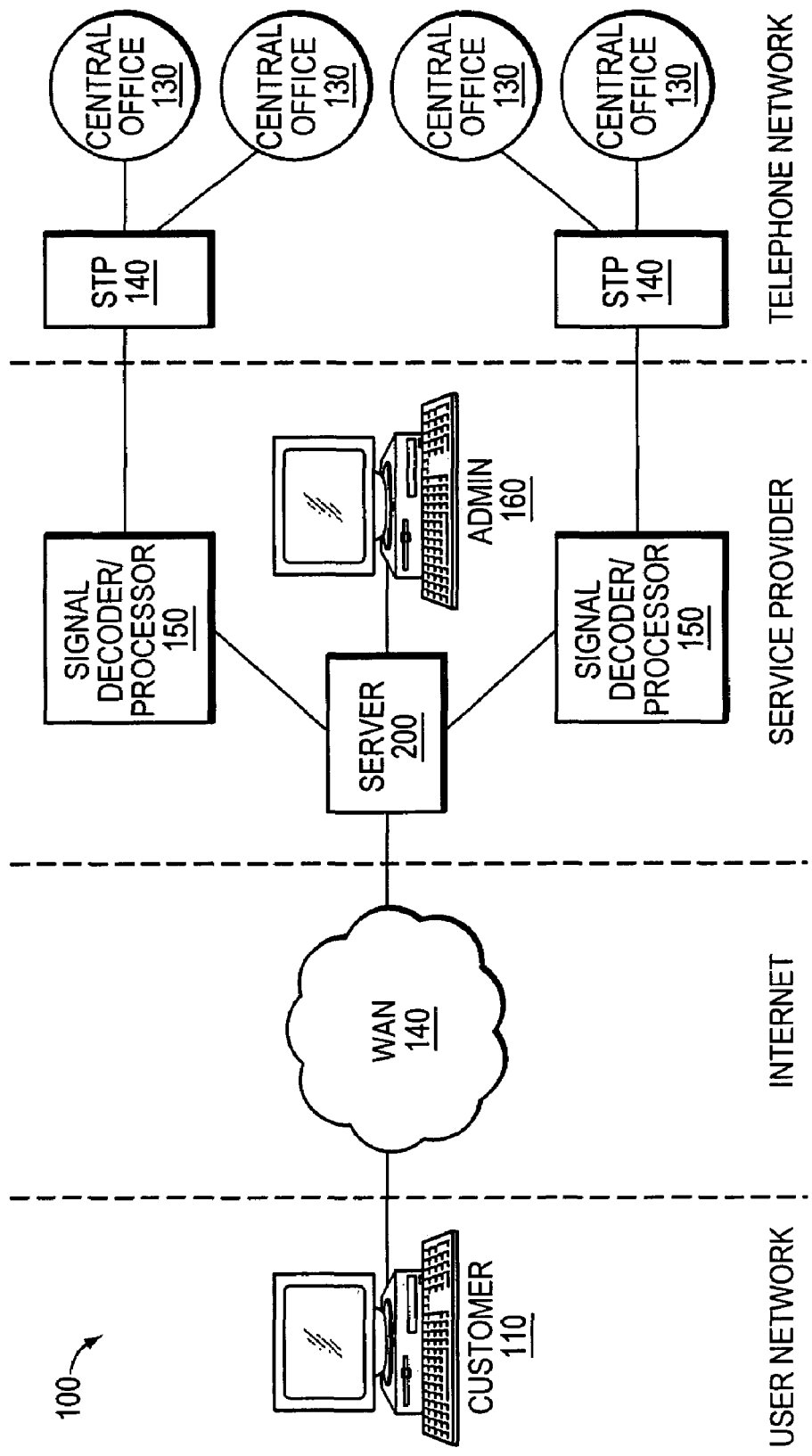
FIG. 1 is a high-level schematic block diagram of a telecommunications network that may be used with the present invention.

FIG. 1 is a high-level schematic block diagram of an exemplary telecommunications network that may be used with the present invention. Network 100 comprises end node 110 and 160 coupled to a server 200 via a wide-area network (WAN) 140, such as the Internet. End nodes 110 and 160 are illustratively personal computers (PCs) that communicate with server 200 using various protocols, such as the Transport Control Protocol/Internet Protocol (TCP/IP) and the Hypertext Transfer Protocol (HTTP). Network 100 further comprises one or more signal processors 150 coupled to server 200 and a telephone network that provides toll free service, such as the well-known public switched telephone network (PSTN). Signal decoder/processors 150 are nodes that are configured to collect and process signaling data, such as Signaling System 7 (SS7) signaling data, from Signal Transfer Points (STPs) 140 contained in the telephone network. The signal decoder/processors 150 generate call information records (CIRs) from the signaling data and transfer the CIRs to the server 200. The STPs 140 are coupled to one or more central offices 130 which are also part of the telephone network. The central offices 130 are configured to handle various telephone calls made in the telephone network including telephone calls that involve toll free numbers.

The signal decoder/processor 150 collects signaling data from the telephone network using a non-intrusive probe. Software that may be used to implement functions of signal decoder/processor 150 is available from Tekno Telecom, LLC, Naperville, Ill.

Figure 2:
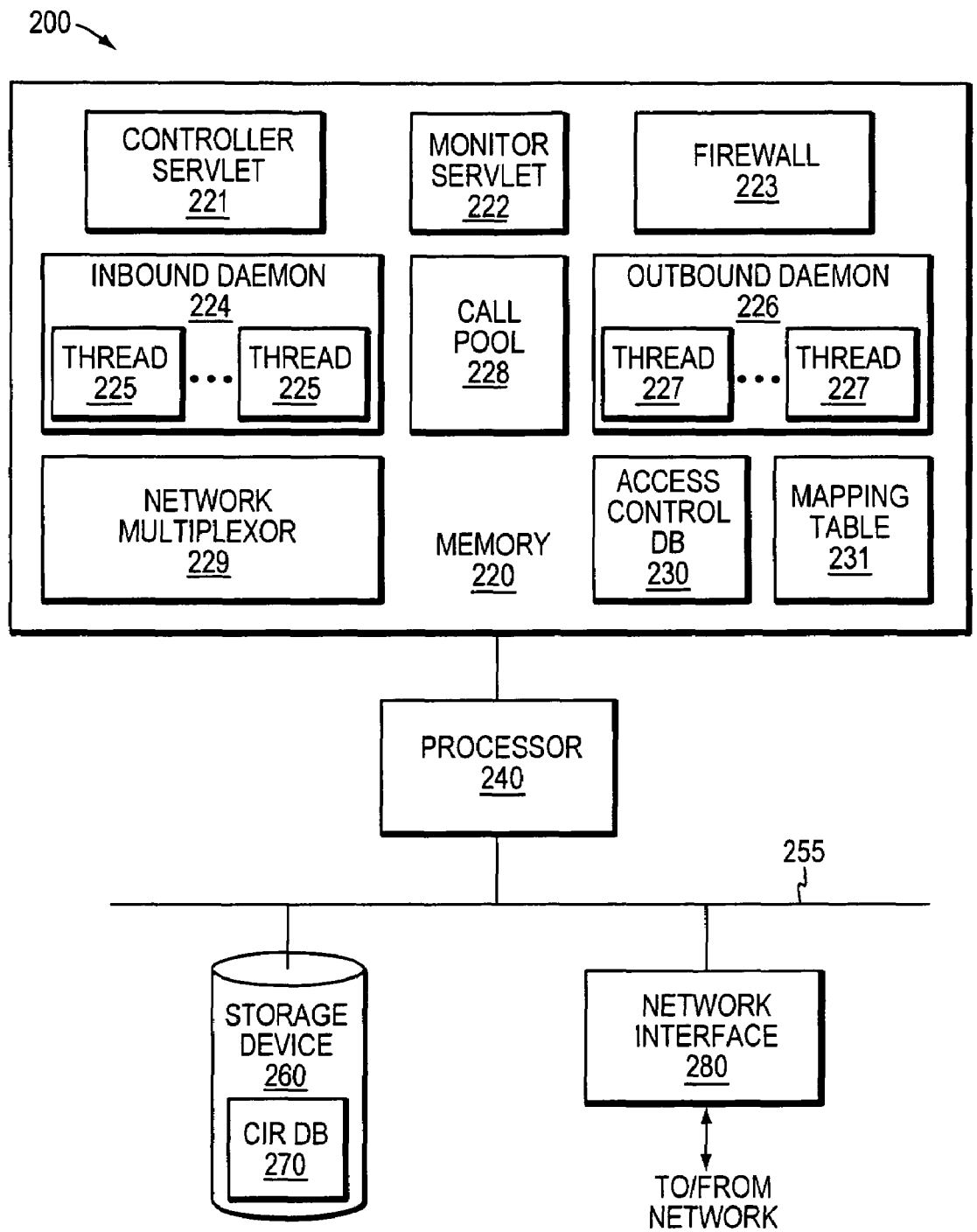
FIG. 2 is a high-level partial schematic block diagram of a server that may be used with the present invention.

FIG. 2 is a high-level partial schematic block diagram of server 200. Server 200 comprises a memory 220, a processor 240 and various input/output (I/O) devices coupled to the processor 240 via an I/O bus 255. The I/O devices include a storage device 260 containing a CIR database (DB) 270 and a network interface 280. The network interface 280 interfaces the server 200 with the network 100 and enables data (e.g., packets) to be transferred between the server 200 and other nodes in the network 100, such as end node 110 and signal decoder/processors 150. The storage device 260 is illustratively a high-capacity storage device capable of storing CIRs produced by the signal decoder/processors 150 in CIR DB 270. DB 270 is a conventional database capable of storing CIR information associated with approximately 77,000 toll free calls per day. Software that may be used to implement CIR DB 270 is available from Oracle Corporation, Redwood Shores, Calif.

The memory 220 is a computer-readable medium organized as a random-access memory (RAM) and implemented using various RAM devices, such as dynamic-random-access memory (DRAM) devices. The memory is configured to hold various computer executable instructions and data structures including computer executable instructions and data structures that implement aspects of the present invention. It should be noted that other computer readable mediums, such as disk units and flash memory, may be configured to hold computer readable instructions and data that implement aspects of the present invention. In addition, it should be noted that various electromagnetic signals may be encoded to carry instructions and data that implement aspects of the present invention.

Memory 220 contains controller servlet 221, monitor servlet 222, firewall 223, inbound daemon 224, outbound daemon 226, call pool 228, network multiplexor 229, access control DB 230 and mapping table 231. Controller servlet 221 is illustratively a Java™ servlet configured to process requests generated by users (e.g., customer 110) and control user access to resources contained in server 200. These requests may include requests for certain reports that report the usage of toll free numbers associated with the user. Monitor servlet 222 is illustratively a Java™ servlet configured to monitor the operation of the server and provide various conventional administrative functions to the server's administrator 160. Firewall 223 is illustratively a conventional software firewall configured to control access to server 200 from users accessing the server via the WAN 140 (e.g., customer 110).

Inbound daemon 224 is a software process configured to process data (i.e., CIRs) acquired from the signal decoder/network processors 150 via the network multiplexor 229. This processing includes storing the data in call pool 228. Inbound daemon 224 contains one or more threads 225 that are configured to, inter alia, handle data acquired from the network multiplexor 229 and store the data in a specific area of the call pool 228.

Outbound daemon 226 is a software process configured to process data contained in the call pool and store the processed data in CIR DB 270. Outbound daemon 226 contains one or more threads 227 configured to transfer data from specific areas of the call pool 228 to the CIR DB 270. The call pool 228 is illustratively configured to buffer data transferred between the inbound daemon 224 and the outbound daemon 226. Network multiplexor 229 acquires data from the various signal decoder/processors 150 and transfers the data to particular threads 225 of the inbound daemon 224. Advantageously, using multiple threads in both the inbound 224 and outbound 226 daemons enables large amounts of data that are acquired from the signal decoder/processors 150 to be processed by server 200 as each thread may be configured to process particular portions of the acquired data. In addition, buffering data in the call pool 228 enables the input daemon 224 to operate independently from the output daemon 226, thus further enhancing the overall system's ability to handle large volumes of data.

The access control DB 230 is a data structure illustratively organized as a database containing one or more records (described further below) that hold information about users that may access resources associated with server 200. Information contained in these records is used by the controller servlet 221 to determine which resources on server 200 a user may access. The mapping table 231 is a data structure illustratively organized as a table containing one or more entries that are, as will be described further below, used to map customers with toll free numbers.

It should be noted that memory 220 may contain other software and data structures, such as an operating system that is configured to control execution of various servlets, processes and treads contained in memory 220.

In accordance with the present invention, information associated with calls involving toll free numbers are stored as CIRs. FIG. 3 is a schematic block diagram of a CIR 300 that may be used with the present invention. CIR 300 comprises a start time field 320, an end time field 330, a calling number field 340, a called number field 350, a call completion status field 360 and a call disposition field 370. The start time 320 and end time 330 fields hold values that represent a start time and an end time of a particular toll free call, respectively. Illustratively, the times represented in fields 320, 330, include a time and date value, and have a granularity of one minute. The calling number field 340 holds a value that represents a phone number of a caller of a toll free number represented in the called number field 350. The called number field 350 holds a value that represents the toll free number that was called. The call completion status 360 holds a value that indicates whether the call was completed and the call disposition field 370 holds a value that indicates a disposition of the call. Illustratively, the call disposition field 370 holds well-known SS7 call disposition codes provided by various SS7 signals processed by the signal decoder/processors 150.

As noted above, controller servlet 221 provides various access control functions configured to control access to the server 200. One of these functions involves ensuring that users are authenticated before allowing them to access resources on server 200 (e.g., information contained in CIR DB 270). Access control DB 230 contains user authorization records that are used by controller servlet 221 to determine whether a user may access these resources. FIG. 4 is a schematic block diagram of a user authentication record 400 that may be used with the present invention.

Record 400 comprises a username field 420, a password field 430, a customer identification field 440 and an authorization level field 450. It should be noted that record 400 may contain other fields, such as a status field that provides a status associated with the record (e.g., active, inactive). The username 420 and password 430 fields hold values that represent a username and password of a user. The customer identification field 440 holds identification information associated with the users. This identification information may include a company name, a branch location and a department associated with the user.

The user authorization level field 450 holds a value that represents a level of authorization for the user. The level of authorization indicates a level of access available to the user. For example, this field may hold a value that indicates the user is an administrative user, thus providing e.g., administrative access to the server's resources. Likewise, for example, this field may hold a value that indicates the user is a business user and thus limit the user's access to certain CIR data contained in DB 270 that is associated with the user's customer identification 440.

Figure 5:
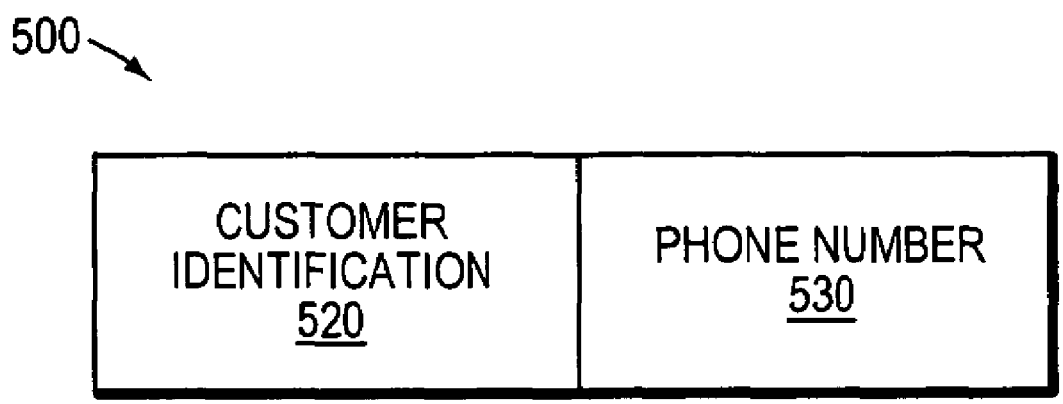
FIG. 5 is a schematic block diagram of a mapping table record that may be used with the present invention.

FIG. 5 is a schematic block diagram of a mapping table record 500 that may be used with the present invention. Record 500 comprises a customer identification field 520 and a phone number field 530. The customer identification field 520 holds identification information associated with the users. This identification information may include a company name, a branch location and a department associated with the user. The phone number field 530 illustratively holds a value that represents a particular toll free number associated with the customer (represented by the customer identification).

Referring again to FIGS. 1 and 2, illustratively, SS7 signaling data associated with toll free calls are generated by switches contained in the central offices 130 and are monitored by the STPs 140 using well-known monitoring techniques. The monitored signaling data is transferred from the STPs 140 to the signal decoder/processors 150 where information from the signaling data is extracted, placed into CIRs 300 and forwarded to the server 200, via TCP/IP connections between the server and the signal decoder/processors 150. The server 200 acquires the CIRs 300 via network interface 280 (FIG. 2) and forwards them to the network multiplexor 229. The network multiplexor 229 processes the data including forwarding certain CIRs 300 to certain input daemon threads 225 which stores the CIRs in various locations contained in the call pool 228. The outbound daemon threads 227 acquire the CIRs from the call pool 228 and place them in specific locations contained in the CIR DB 270.

A customer 110 accesses the server 200 via WAN 140 through firewall 223 and supplies a username and password to the controller servlet 221 using, e.g., a web browser interface. The controller servlet 221 authenticates the user by comparing the supplied username and password with usernames and passwords contained in records 400 of access control DB 230. If a record containing a username 420 and password 430 matches the supplied username and password, the user is authorized to access resources on the server 200 with a level of authorization 450 specified in the matching record 400. Depending on the level of authorization, the user may request various reports associated with the usage of toll free associated with the user's customer identification based on CIR information contained in CIR DB 270.

An administrative user gains access to the server directly via end node 160. An administrative user is a special user that has privileges to perform various functions on server 200 that are not normally available to customer users. For example, an administrative user may access the monitor servlet 222 to request certain maintenance information related to the server 200. This information may include various volume metrics associated with server 200, such as the number of CIRs processed for a certain period, number of reports requested by users and so on. In addition, administrative users may, through the controller servlet 221, perform various maintenance functions associated with server 200, such as accessing, modifying and archiving records in the access control DB 230, mapping table 231 and CIR DB 270. These functions are not normally granted to business users.

According to the present invention, various reports related to toll free number usage may be generated from data contained in the CIR DB 270 and presented to various users. Specifically, these reports include a call view detail report, a completion summary report, a call disposition report, a calling location report, a calling city statistics report, a call frequency statistics report, an elapsed time statistics report, an originating line statistics report and a caller reattempt statistics report. In addition, a user may schedule specific reports to be generated automatically by server 200 on a periodic basis.

FIG. 6 is an illustration of a call view detail report that may be used with the present invention. The report is generated using various CIRs 300 contained in CIR DB 270 in conjunction with various user specifiable parameters. The parameters include customer identification 601, telephone number filters 602, a timeframe 603, a call completion filter 604 and a generate report type 605. The parameters are used in combination to select various CIRs contained in CIR DB 270 that are used to generate the report. Illustratively, information in a CIR must match the criteria set forth in the various parameters in order to be used to generate the report.

The generate report parameter 605 is illustratively a series of buttons that allow the user to specify whether the output of the report in given as a display, e.g., as a web page coded in hypertext markup language (HTML), or a spreadsheet file, e.g., coded as a Microsoft Excel .xls file.

The customer identification parameter 601 enables a user to specify a company name, branch and department of the customer. This parameter is used to filter out CIRs that do not meet the specified name, branch and department criteria from the report. The telephone number filters parameter 602 enables a customer to specify filters for a called number and a calling number. Illustratively, the called number may be any one or all of the toll free numbers associated with the customer identified in the customer identification parameter 601. This number is used by the controller servlet 221 to filter out CIRs that contain a called number 350 that does not match the called number specified in parameter 602 from the report. Likewise, the calling number is illustratively a user specified phone number that is used by the controller servlet 221 to filter out CIRs that contain a calling number 340 that does not match the calling number specified in parameter 602 from the report. Note that, illustratively, if no calling number is specified in parameter 602, no CIRs are filtered out based on this criterion.

The timeframe parameter 603 contains specified start and end times that are used by the controller servlet to filter out CIRs whose start 320 and end times 330 are not between the specified start and end times, inclusive. The call completion filter 604 specifies a filter that is used to filter out CIRs whose call completion status 360 does not match the specified call completion status. Note that a call completion status that specifies "all calls" causes no CIRs to be filtered out based on this criterion.

The report illustratively includes a table containing various rows and columns of information about toll free calls represented by the selected CIRs. Each row illustratively contains information related to a particular toll free call as represented in a CIR 300. An originating city column 610 and state column 620 report the city and state of the number that originated the call. Thus, for example, the call represented in row 620 originated in the city and state of Mission, Tex. Illustratively, this information is derived from information contained in a CIR's calling number field 340.

The called number 612 and calling number 613 columns report the called toll free number and the phone number of the caller that called the toll free number, respectively. Thus, for example, for the call reported in row 620, the toll free number that was called is "(866) 687-8140" and the calling number is "(956) 458-9002." Illustratively, this information is derived from information contained in the calling number 340 and called number 350 fields, respectively, in a CIR.

The start date and time column 614 reports the start date and time of the call. Thus, for example, for the call reported in row 620, the start date is "Apr. 01, 2004" and the start time is "23:33:03." Illustratively, this information is derived from information contained in the start 320 and end 330 time fields of the CIR.

The completion status column 615 reports an indicator that indicates whether the call was completed. For example, the call reported in row 620 reports an indicator "C" that indicates the call was completed. Illustratively, the call completion status is derived from the information contained in the call completion status field 360 of the CIR 300 used to generate the data reported in the row.

The call disposition column 616 reports a description of the disposition code associated with the call. For example, the description of the disposition code for the call reported in row 620 is "call completed." Illustratively, this disposition code is derived from the call disposition code 370 contained in CIR 300 used to generate the data reported in the row.

The duration column 617 reports a duration associated with the call. For example, the duration of the call reported in row 620 is "00:00:16" or 16 seconds. Illustratively, the duration is derived by subtracting the start time 320 from the end time 330 contained in the CIR 300 used to generate the data reported in the row.

Figure 7:
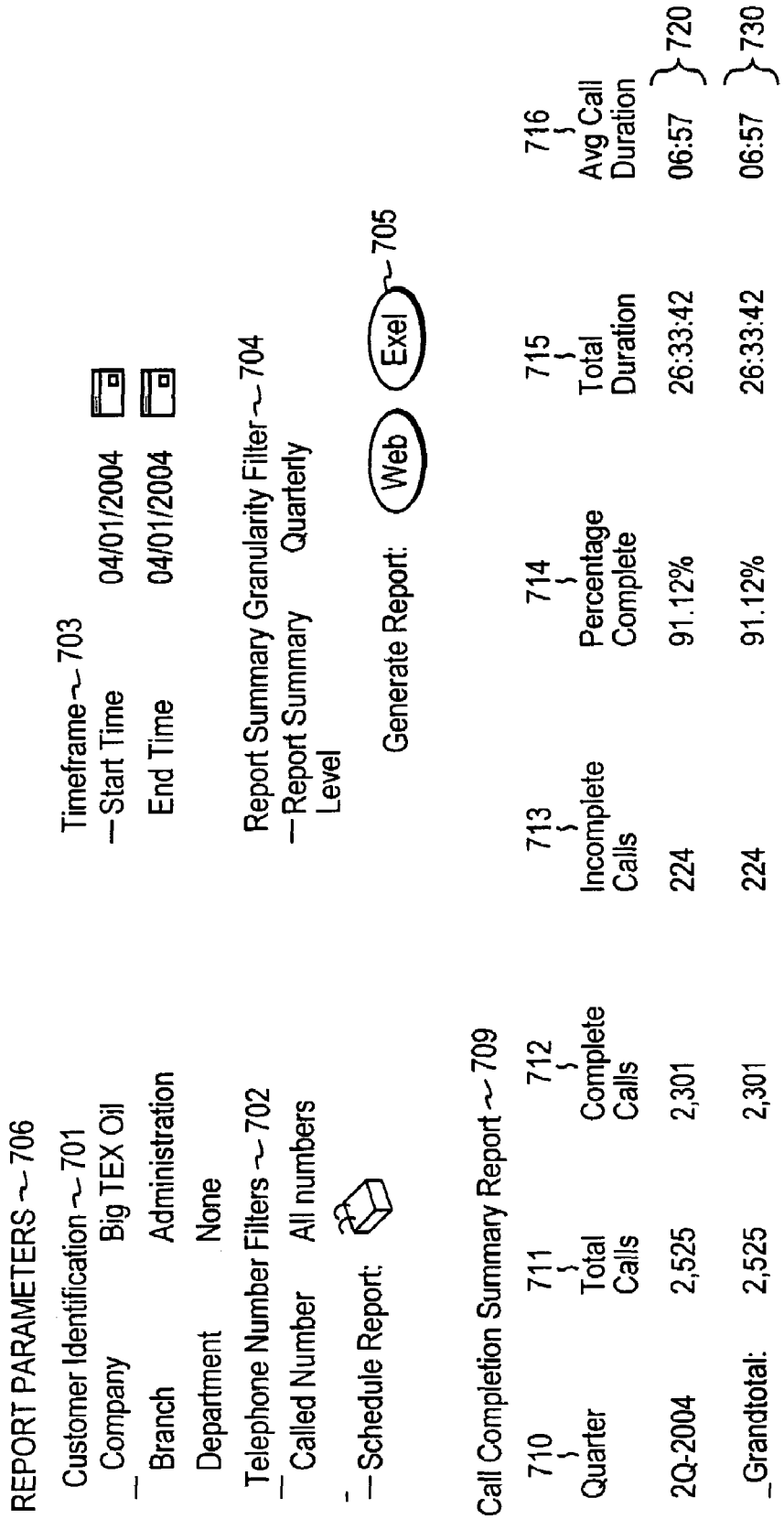
FIG. 7 is an illustration of a call completion summary report that may be used with the present invention.

FIG. 7 is an illustration of a call completion report that may be used with the present invention. The report is generated using various CIRs 300 contained in CIR DB 270 in conjunction with various user specifiable parameters. These parameters are specified in various sections of the report parameters section 706 including the customer identification section 701, telephone number filters section 702, timeframe section 703, report summary granularity filter section 704 and generate report type section 705. The parameters specified in these sections are used in combination to select various CIRs contained in CIR DB 270 that are used to generate the report. Illustratively, information in a CIR must match criteria set forth in the various parameters in order to be used to generate the report.

The customer identification 701, telephone number filters 702, time frame 703 and generate report 705 parameters are similar to the customer identification 601, telephone number filters 602, time frame 603 and generate report 605 parameters described above. The report summary granularity filter 704 enables a user to specify a granularity (e.g., quarterly, monthly, weekly, daily and hourly) for the report.

The report illustratively contains a table having various rows and columns of information. The rows contain information associated with a specific time period as illustratively specified by the report summary granularity filter 704. The columns contain information with respect to time periods including the time period 710, a total number of calls within the time period 711, a total number of completed calls within the time period 712, a total number of incomplete calls within the time period 713, a percentage of complete calls within the time period 714, a total duration of calls within the time period 715 and an average call duration within the time period 716.

Specifically, the time period column 712 reports the time period for the information reported in a particular row. Thus, for example, the time period for row 720 includes the second quarter of the year 2004. The total calls column 711 reports the total number of calls represented in the CIRs for the time period reported in column 710 given the parameters specified in the report parameters section of the report. Thus, for example, for row 720, the number of calls for the second quarter of 2004 given the parameters specified in the report parameters section was 2,525 calls. The complete calls 712 and incomplete calls 713 fields report a number of complete calls and incomplete calls as reported in the CIRs for the time period reported in column 710 and the given the specified parameters. The percentage complete column 714 reports a percentage of completed calls for the time period specified in column 710. The total duration 715 and average call duration 716 columns report the total duration and the average duration of all calls in, e.g., hours, minutes and seconds for all completed calls in the time period. The report also includes a grand total (e.g., row 730) which contains sums of various columns.

FIG. 8 is an illustration of a call disposition summary report that may be used with the present invention. The report is generated using various CIRs 300 contained in CIR DB 270 in conjunction with various user specifiable parameters. These parameters include customer identification 801, telephone number filters 802, a timeframe 803, a report summary granularity filter 804 and generate report type 805. These parameters are used in combination to select various CIRs contained in CIR DB 270 that are used to generate the report.

Illustratively, information in a CIR must match criteria set forth in the various parameters in order to be used to generate the report.

The customer identification 801, telephone number filters 802, time frame 803, report summary granularity filter 804 and generate report 805 parameters are similar to the customer identification 601, telephone number filters 602, time frame 603, report summary granularity filter 704 and generate report 605 parameters described above.

The report illustratively contains a table having various rows and columns of information. The rows contain information associated with a specific time period illustratively specified by the report summary granularity filter 804. The columns contain various information about the time periods including the time period 810, a total call attempts for the time period 811, a total number of completed call attempts 812, a total amount of time the completed calls were placed on hold for the time period 813, a total amount of time that the completed calls included billed minutes 814, a total number of incomplete attempted calls 815, a total amount of time of incompleted calls that were placed on hold 816, a percent of completed calls 817, an amount of time that represents a total duration of completed calls 818 and an amount of time that represents an average duration of the completed calls 819. Row 830 contains information associated with a particular time period. The report also includes a grand total (e.g., row 840) which contains sums of various columns.

Figure 9:
FIG. 9 is an illustration of a calling location summary report that may be used with the present invention.

FIG. 9 is an illustration of a call location summary report that may be used with the present invention. The report is generated using various CIRs 300 contained in CIR DB 270 in conjunction with various user specifiable parameters. These parameters include customer identification 901, telephone number filters 902, a timeframe 903, a report summary granularity filter 904 and generate report type 905 parameters. These parameters are used in combination to select various CIRs contained in CIR DB 270 that are used to generate the report. Illustratively, information in a CIR must match criteria set forth in the various parameters in order to be used to generate the report.

The customer identification 901, telephone number filters 902, time frame 903 and generate report 905 parameters are similar to the customer identification 601, telephone number filters 602, time frame 603 and generate report 605 parameters described above. The location granularity filter 904 specifies a drill down level that enables a user to generate successive reports that "drill down" to a particular location, such as a location associated with a particular area code, city or zip code.

The report illustratively contains a table having various rows and columns of information. The rows contain information associated with a specific location illustratively specified by the report summary granularity filter 904. The columns contain various information that make up the call location summary. These columns include a state column 910 which contains values that represent a location (i.e., state) of the callers, a total calls column 911 which contains values that represent a total number of calls made from that location, a complete calls column 912 which contains values that represent a number of those calls that were completed calls, an incomplete calls column 913 which contains values that represent a number of those calls that were incomplete calls, a percentage complete column 914 which contains values that represent a percentage of the completed calls, a total duration column 915 which contains values that represent a total duration of the completed calls and an average call duration column 916 which contains values that represent an average duration of time for each completed call.

Row 920 illustrates information associated with a particular location. Thus, for example, referring to row 920, the location of the callers is Alaska, the number of calls from that location are 2, the number of calls that were completed is 1, the number of calls that were incomplete is 1, the percentage of completed calls is 50%, and the total duration and the average duration of the calls are 6 minutes and 45 seconds.

The report also includes a domestic total row (e.g., row 930) which contains values that represent total amounts associated with calls made in a particular country (e.g., the United States) and a grand total row (e.g., row 940) which contains sums of various columns.

FIG. 10 is an illustration of a calling city statistics report that may be used with the present invention. The report is generated using various CIRs 300 contained in CIR DB 270 in conjunction with various user specifiable parameters. These parameters include customer identification 1001, telephone number filters 1002, timeframe 1003, frequent caller city filter 1004 and generate report type 1005. These parameters are used in combination to select various CIRs contained in CIR DB 270 that are used to generate the report. Illustratively, information in a CIR must match criteria set forth in the various parameters in order to be used to generate the report.

The customer identification 1001, telephone number filters 1002, time frame 1003 and generate report 1005 parameters are similar to the customer identification 601, telephone number filters 602, time frame 603 and generate report 605 parameters described above. The frequent caller city filter 1004 enables a user to specify a minimum number of calls made from a particular calling number that is used to qualify the caller as a unique caller that may be included in the report. Thus, for example, a city frequency minimum of 5 indicates that at least 5 calls must be made from a particular calling number in order for the caller to qualify as a unique caller.

The report illustratively contains a table having various rows and columns of information. The rows contain information associated with a specific location. The columns contain information that represents various calling city statistics. These columns include a city column 1010, a state column 1011, a unique callers column 1012, a total calls column 1013, a complete calls column 1014, an incomplete calls column 1015, a percentage complete column 1016, a total duration column 1017 and an average call duration column 1018. Specifically, the city 1010 and state 1011 columns contain values that represent a city and a state associated with the row's reported location, respectively. The unique callers row contains values that represent an amount of unique callers from a particular location that has completed a call to the called number specified in the telephone number filters 1002. The total calls 1013, complete calls 1014 and incomplete calls 1015 columns contain values that represent a number of total calls, complete calls and incomplete calls, respectively, that are associated with the called number specified in the telephone number filters 1002 and the location reported in columns 1010 and 1011. The percentage of complete calls column 1016 contains values that represent a percentage of calls that were completed out of the total number of calls 1030. The total duration 1017 and average call duration 1018 columns contain values that represent a total and average call duration, respectively, for calls associated with the row's reported location.

The report includes a domestic total row (e.g., row 1030) which contains values that represent total amounts associated with calls made in a particular country (e.g., the United States) and a grand total row (e.g., row 1040) which contains values that represent sums of various columns.

Figure 11:
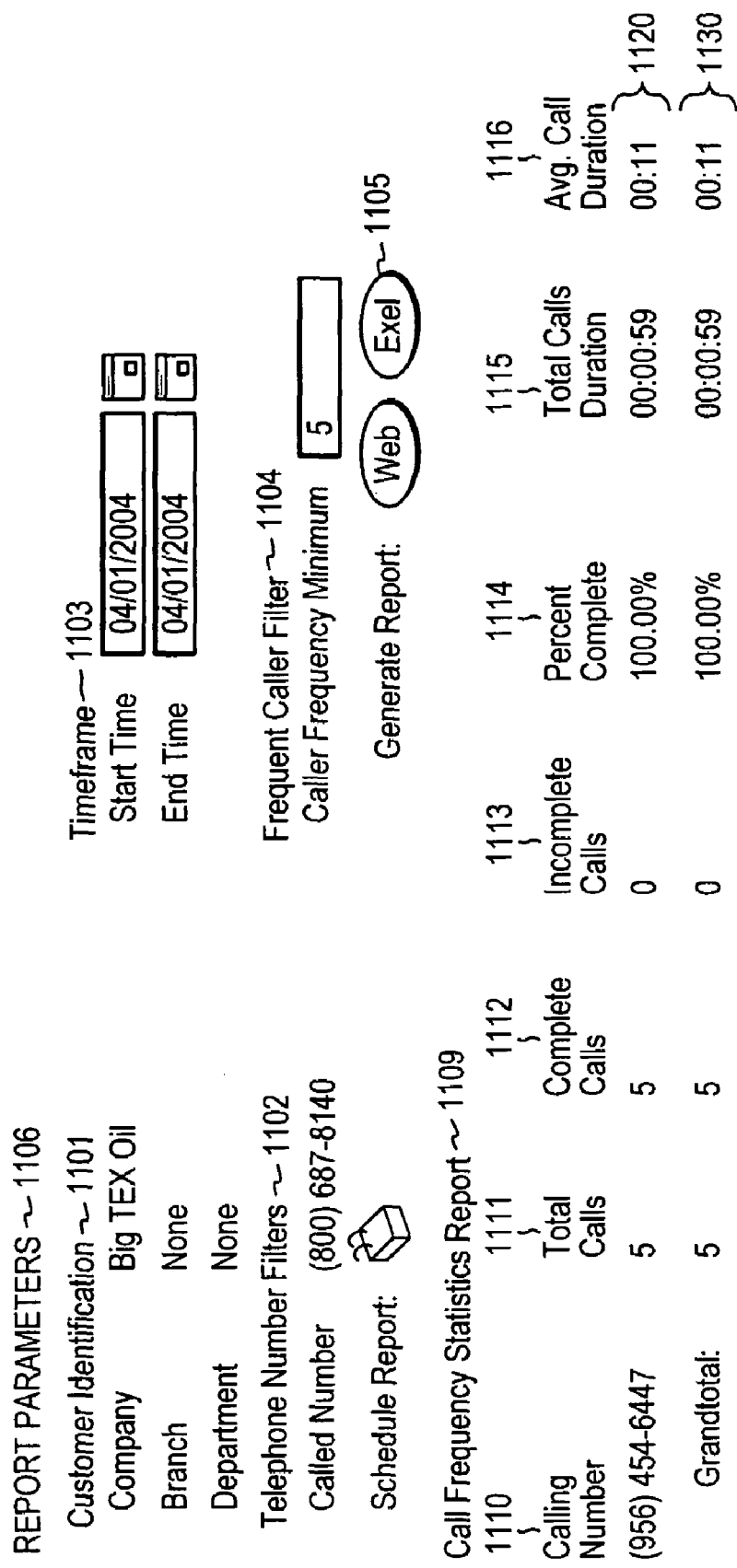
FIG. 11 is an illustration of a call frequency statistics report that may be used with the present invention.

FIG. 11 is an illustration of a call frequency statistics report that may be used with the present invention. The report is generated using various CIRs 300 contained in CIR DB 270 in conjunction with various user specifiable parameters. These parameters include customer identification 1101, telephone number filters 1102, timeframe 1103, frequent caller filter 1104 and generate report type 1105. These parameters are used in combination to select various CIRs contained in CIR DB 270 that are used to generate the report. Illustratively, information in a CIR must match criteria set forth in the various parameters in order to be used to generate the report.

The customer identification 1101, telephone number filters 1102, timeframe 1103 and generate report 1105 parameters are similar to the customer identification 601, telephone number filters 602, time frame 603 and generate report 605 parameters described above. The frequent caller filter 1104 enables a user to specify a minimum number of times a frequent caller has called the called number specified in the telephone number filters 1102 in order to be included in the report.

The report illustratively contains a table having various rows and columns of information. The rows contain information associated with a specific calling number. The columns contain information that represents various call frequency statistics. These columns include a calling number column 1110, a total calls column 1111, a complete calls column 1112, an incomplete calls column 1113, a percent complete column 1114, a total calls duration column 1115 and an average call duration column 1116. The calling number column 1110 contains values that represent a telephone number of a particular caller. The total calls 1111, complete calls 1112 and incomplete calls 1113 columns contain values that represent a total number of calls, a number complete calls and a number of incomplete calls, respectively, for calls made from the calling number 1110 to the called number specified in the telephone number filters 1102. The percent complete column 1114 contains a value that represents a percentage of calls that were completed. The total calls duration 1115 and average call duration 1116 columns contain values that represent an amount of time associated with the duration of calls and average duration of calls, respectively, made from the calling number 1110. The report includes a grand total row (e.g., row 1130) which contains values that represent sums of various columns.

FIG. 12 is an illustration of an elapsed time statistics report that may be used with the present invention. The report is generated using various CIRs 300 contained in CIR DB 270 in conjunction with various user specifiable parameters. These parameters include customer identification 1201, telephone number filters 1202, timeframe 1203, elapsed time filter 1204 and generate report type 1205. These parameters are used in combination to select various CIRs contained in CIR DB 270 that are used to generate the report. Illustratively, information in a CIR must match criteria set forth in the various parameters in order to be used to generate the report.

The customer identification 1201, telephone number filters 1202, time frame 1203 and generate report 1205 parameters are similar to the customer identification 601, telephone number filters 602, time frame 603 and generate report 605 parameters described above. The elapsed time filter 1204 enables a user to specify an elapsed time in seconds.

The report illustratively contains a table having various rows and columns of information. The rows contain information associated with an elapsed time range. The columns contain information that represents the elapsed time statistics and include a time elapsed range column 1210, a total calls column 1211 and a total duration column 1212. The time elapsed range column 1210 contains values that represent a range of times associated with the column. The total calls column 1211 contains values that represent a total number of calls made to the called number specified in the telephone number filters 1202 for the given elapsed time range 1210. The total duration column 1212 contains values that represent a duration, illustratively in seconds, of the calls reported in the total calls column 1211. The report includes a grand total row (e.g., row 1230) which contains values that represent sums of the total calls 1211 and total duration 1212 columns.

FIG. 13 is an illustration of an originating line statistics report that may be used with the present invention. The report is generated using various CIRs 300 contained in CIR DB 270 in conjunction with various user specifiable parameters. These parameters include customer identification 1301, telephone number filters 1302, a timeframe 1303 and a generate report type 1305. These parameters are used in combination to select various CIRs contained in CIR DB 270 that are used to generate the report. Illustratively, information in a CIR must match criteria set forth in the various parameters in order to be used to generate the report. The customer identification 1301, telephone number filters 1302, time frame 1303 and generate report 1305 parameters are similar to the customer identification 601, telephone number filters 602, time frame 603 and generate report 605 parameters, described above.

The report illustratively contains a table having various rows and columns of information. The rows contain information associated with a specific called number. The columns contain information that represents the originating line statistics for the called number. The columns include a called number column 1310, an originating line indicator (OLI) column 1311, an OLI description column 1312, a total calls column 1313, a complete calls column 1314 an incomplete calls column 1315 and a percentage complete column 1316. The called number column 1310 contains values that represent a called number associated with the row. Illustratively, this called number is a number specified as the called number in the telephone number filters 1302. The OLI column 1311 contains values that represent an indicator associated with the called number 1310. The OLI description column 1312 contains values that represent a description of the OLI 1311. The total calls 1313, complete calls 1314 and incomplete calls 1315 columns contain values that represent a total number of calls, complete calls and incomplete calls, respectively, that are associated with the combination of the row's called number and OLI values in the called number 1310 and OLI 1311 columns. The percentage complete column 1316 contains values that represent a percentage of the calls completed out of the total number of calls made for a given row. The report includes a grand total row (e.g., row 1330) which contains values that represent sums of the total calls 1313, complete calls 1314 and incomplete calls 1315 columns as well as an overall percentage of completed calls.

FIG. 14 is an illustration of a call reattempt statistics report that may be used with the present invention. The report reports statistics associated with call attempts. The report is generated using various CIRs 300 contained in CIR DB 270 in conjunction with various user specifiable parameters. These parameters include customer identification 1401, telephone number filters 1402, a timeframe 1403 and generate report type 1405. These parameters are used in combination to select various CIRs contained in CIR DB 270 that are used to generate the report. Illustratively, information in a CIR must match criteria set forth in the various parameters in order to be used to generate the report.

The customer identification 1401, telephone number filters 1402, time frame 1403 and generate report 1405 parameters are similar to the customer identification 601, telephone number filters 602, time frame 603 and generate report 605 parameters described above. The caller attempt filter 1404 enables a user to specify a retry window which is an amount of time illustratively in hours and a lost call threshold time which is an amount of time illustratively in seconds. The lost call threshold specifies an amount of time that represents a minimum amount of time a call must last before it is considered dropped. The retry window specifies a period of time that represents a window of time a caller must retry a call that was dropped before the call is considered lost. Thus, for example, if the duration of a call is less than the lost call threshold specified, the call is considered dropped. If the duration of a call is greater than or equal to the threshold, the call is considered a completed call. If a dropped call is not retried by the caller within the amount of time specified by the retry window, the call is considered lost.

The report illustratively contains a table having various rows and columns of information. The rows contain information associated with a number of attempts made to complete a call. The call attempts column 1410 indicates a number of call attempts made by the caller to complete a call. The number of callers column contain values that represent a number of unique callers that called the toll free numbers specified in the telephone number filters section 1402. The calls over the threshold column 1412 contains values that represent a number of calls that were complete (i.e., their duration is equal to or greater than the lost call threshold parameter). The calls under threshold column 1413 contains values that represent a number of calls that were dropped (i.e., the number of calls whose duration were less than the lost call threshold specified in the caller attempt filter parameters 1404). The lost calls column 1414 contains values that represent a number of lost calls. The cumulative percent complete column 1415 contains values that represent a percentage of completed calls.

Figure 15:
FIG. 15 is an illustration of an input screen that may be used to subscribe and unsubscribe to reports in accordance with the present invention.

In accordance with the inventive technique, a user, such as customer 110 (FIG. 1), may schedule reports that are automatically generated by server 200. Moreover, illustratively, these reports may be e-mailed to the user by server 200. FIG. 15 is an illustration of an input screen that may be used to enable a user to subscribe to or unsubscribe from reports automatically generated in accordance with the present invention. Referring to FIG. 15, the input screen comprises a subscribed reports section 1510 which shows reports currently subscribed to by the user and an available reports section 1550 which shows reports available to the user the user is not currently subscribed to.

The subscribed reports section 1510 contains various columns of information including an unsubscribed column 1520 which provides checkboxes that enable a user to unsubscribe to various reports that are subscribed to, a report name column 1525 that contains values that represent a name of a report currently subscribed to, a created column 1530 that contains values that represent a date and time when the report was created, a last executed column 1535 that contains values that represent a date and time the report was last generated and a report inbox column 1540 that contains values that represent reports that have been generated and are currently available for display.

A user may choose to unsubscribe to a report by checking the checkbox next to the report's name and selecting an "unsubscribe to checked reports" button 1545. Thus, for example, a user may unsubscribe to the "Call Disposition Daily" report by checking check box 1522a then pressing button 1545.

The available reports section 1550 contains various columns that show information related to reports currently subscribed to by the user. This information includes a subscribe column 1560 which enables a user to subscribe to a particular report, a report name column 1565 which gives the name of a report that is available, a created column 1570 that indicates a date and time when the available report was created and a created by column 1575 which indicates a user that created the report. In addition, this section 1550 contains check boxes 1562a-b which enable a user to specify a report to subscribe to and a "subscribe to checked reports" button 1580 which enables a user to subscribe to a particular report. Thus, for example, a user may subscribe to the "Call Frequency Statistics" report by checking checkbox 1562a then pressing button 1580.

The input screen in FIG. 15 also contains a pushbutton 1590 that enables a user to create a new report. Pressing the pushbutton causes the system to display a report parameters input screen that enables a user to specify parameters associated with the new report. FIG. 16 is an illustration of a report parameters input screen that may be used with the present invention.

The report parameters input screen contains a report delivery frequency section 1601, report data timeframe section 1602, a report type section 1603, a report title section 1604, a telephone number filters section 1605, a customer identification section 1606, a call completion filter 1607, a subscription email section 1608, a report visibility section 1609 and a report format section 1610. The report delivery section enables the user to specify a time period (e.g., daily, weekly, monthly, quarterly) when the report is generated and available to the user. The report data timeframe section 1602 enables the user to specify a time frame for the report (e.g., daily, weekly, monthly, quarterly) and whether the report includes events up to the last complete day or the current day's events. The report type section 1603 enables the user to specify a type of report to generate. Illustratively, the type of reports that may be generated include the reports described above. The report title section 1604 enables the user to specify a name for the report. The telephone number filters section 1605, customer identification section 1606 and the call completion filter section 1607 enables a user to specify parameters similar to the parameters in the telephone number section 602, customer identification section 601 and call completion filter section 604 described above. The subscription email section 1608 enables a user to specify an e-mail address that is to receive a notification after the report has been generated. The report visibility section 1609 contains parameters that enable a user to indicate whether the report may be shared with other users or is private only to the user that created the report. The report format section enables the user to specify whether the report's format is generated as an HTML file that may be displayed by a web browser or as a spreadsheet (e.g., Excel spreadsheet).

Figure 17:
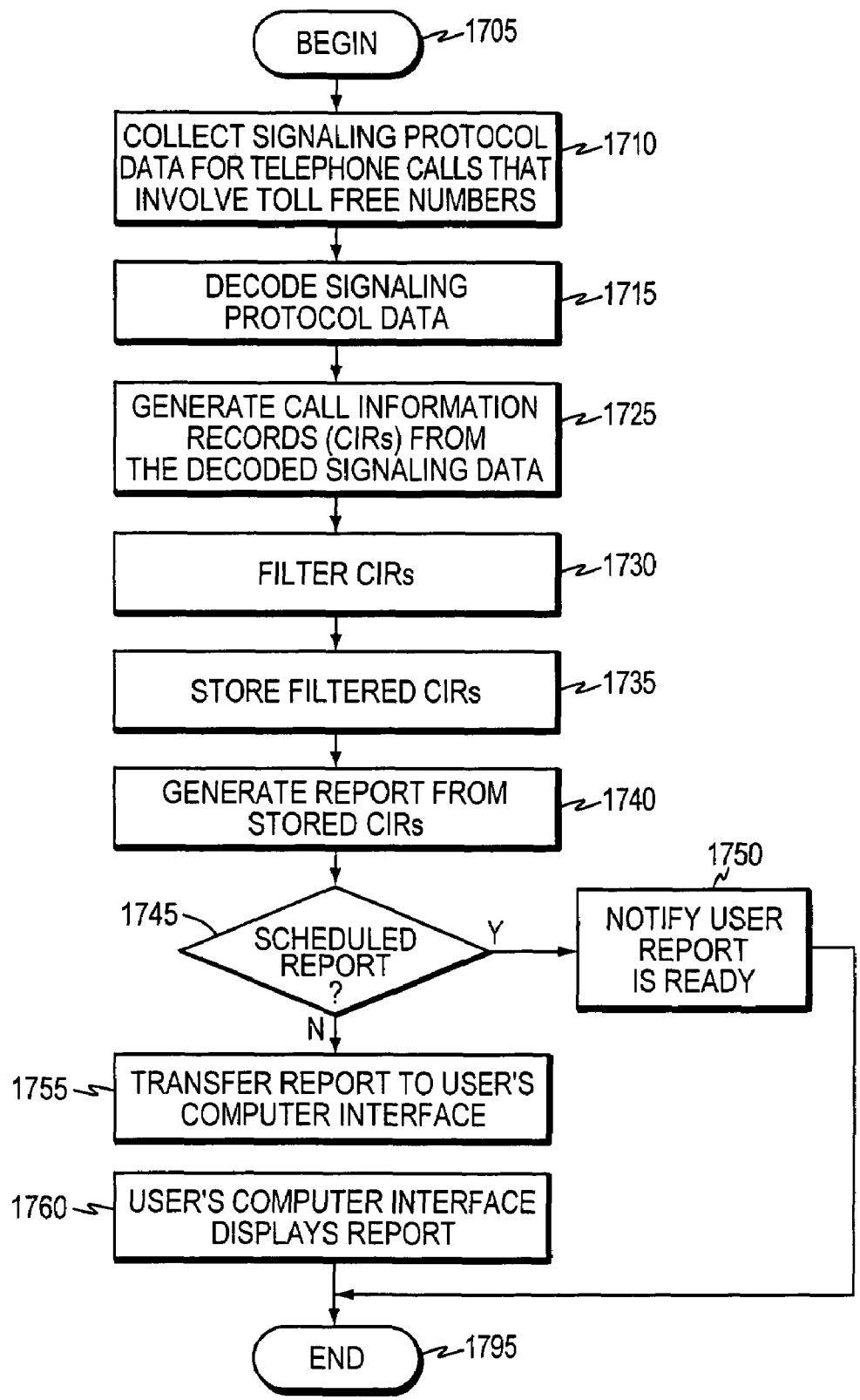
FIG. 17 is a flow diagram of a sequence of steps that may be used to generate a report in accordance with the present invention.

In accordance with the present invention, signaling data associated with toll free calls are decoded to produce CIRs. These CIRs are stored by server 200 in CIR DB 270. Reports are generated from the stored CIR information and made available to users. FIG. 17 is a sequence of steps that may be used to generate a report for a user in accordance with the present invention.

The sequence begins at step 1705 and proceeds to step 1710 where signaling protocol data are collected for telephone calls that involve toll free telephone numbers. As noted above, illustratively, signal decoder/processor probes 150 collect the signaling data from the STPs 140 which, in turn, acquire the signaling data from the central offices 130. At step 1715, the signaling data are decoded and, at step 1725, the decoded data are used to generate CIRs. Illustratively, the signal decoder/processor probes 150 generate CIRs 300 from the collected signaling data. The generated CIRs 300 are then transferred to the server 200.

At step 1730, the CIRs are filtered to exclude CIRs not used to generate reports. Illustratively, server 200 is configured by the administrator 160 to filter out CIRs that are not associated with a customer's toll free numbers. This, advantageously, enhances manageability of the CIR data generated by the signal decoder/processors probes 150 by constraining the data to those CIRs that are used to generate reports for users, such as customer 110. Next, at step 1735, the filtered CIRs are illustratively stored in CIR DB 270.

At step 1740, the stored CIRs are used to generate a report. Illustratively, the server 200 generates a report based on parameters specified for the report as well as CIR information stored in CIR DB 270. Thus, for example, server 200 generates a "Call View Detail Report" (FIG. 6) based on parameters specified in the report parameters section 606 and CIR information stored in the CIR DB 270.

At step 1745, a check is performed to determine if the report is a scheduled report that has been subscribed to by the user, as described above. If so, the user is notified of the report (step 1750). Illustratively, the user is notified via an e-mail that contains a Uniform Resource Locator (URL) that points to the report. Otherwise, the report is transferred to the user's computer interface (e.g., a web browser) and displayed by the interface (steps 1755 and 1760). The sequence ends at step 1795.

Although the above described embodiment of the invention describes aspects of the invention as implemented in software or hardware, it should be understood that in other embodiments of the present invention these aspects may be implement in some combination of hardware or software. For example, various functions performed by the network multiplexor 229 may be implemented in hardware to accelerate transferring CIRs to the various inbound daemon threads 225.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for reporting usage of a called telephone number to a computer user at a computer interface, the method comprising:
    identifying, via signaling data, a completed call made from a calling number to the called telephone number when a dropped call duration counter exceeds a dropped call threshold duration, and identifying a lost call made from the calling number to the called telephone number when the dropped call counter is below the dropped call threshold duration and the calling number fails to retry the call within a retry threshold duration;
    generating a report, that reports usage of the called telephone number, from one or more call information records (CIRs), wherein the one or more CIRs are produced from the signaling data associated with one or more telephone calls that involve the called telephone number; and
    transferring the report to the computer user's computer interface.

2. A method as defined in claim 1 further comprising employing a Signaling System 7 (SS7) signaling protocol.

3. A method as defined in claim 1 wherein the called telephone number is a toll free number.

4. A method a defined in claim 3 wherein the computer interface is a web browser.

5. A method as defined in claim 1 further comprising displaying the report using the computer user's computer interface.

6. A method as defined in claim 1 further comprising storing the one or more CIRs in a database.

7. A method as defined in claim 1 further comprising:
    filtering the one or more CIRs; and
    storing the filtered CIRs in a database.

8. A method as defined in claim 1 further comprising notifying the user that the report has been generated.

9. A method as defined in claim 8 wherein the user is notified using an electronic mail (e-mail) message.

10. A method as defined in claim 1 wherein the report is generated at a predetermined time.

11. A method as defined in claim 10 wherein the predetermined time is established by the computer user.

12. A method for reporting usage of a toll free telephone number to a computer user at a computer interface, the method comprising:
    collecting signaling protocol data for one or more completed telephone calls that involve the toll free telephone number;
    decoding the signaling protocol data;
    identifying, via the signaling data, a completed call made from a calling number to the toll free telephone number when a dropped call duration counter exceeds a dropped call threshold duration, and identifying a lost call made from the calling number to the toll free telephone number when the dropped call counter is below the dropped call threshold duration and the calling number fails to retry the call within a retry threshold duration;
    producing one or more call information records (CIRs) from the decoded signaling data;
    generating a report, that reports usage of the toll free telephone number, from the one or more CIRs; and
    transferring the report to the computer user's computer interface.

13. A server for reporting usage of a called telephone number to a computer user at a computer interface, the server comprising:
    a network interface configured to acquire one or more call information records (CIRs), the one or more CIRs being produced from signaling data associated with one or more telephone calls that involve the called telephone number; and
    a computer configured to:
    identify a completed call made from a calling number to the called telephone number when a dropped call duration counter exceeds a dropped call threshold duration value, and identify a lost call made from the calling number to the called telephone number when the dropped call counter is below the dropped call threshold duration value and the calling number fails to retry the call within the retry threshold duration value;
    generate a report, that reports usage of the telephone number, from the one or more CIRs, and
    transfer the report to the computer user's computer interface.

14. A server as defined in claim 13 further comprising a storage device containing a database, wherein the processor is further configured to store acquired CIRs in the database.

15. A server as defined in claim 14 wherein the processor is further configured to:
    filter CIRs; and
    store the filtered CIRs in the database.

16. A server as defined in claim 13 further comprising:
an inbound daemon associated with one or more inbound threads; and
a multiplexor configured to transfer the CIRs to the one or more inbound threads.

17. A server as defined in claim 16 further comprising a call pool to hold the acquired CIRs, and wherein the inbound threads are to store the CIRs in the call pool.

18. A server as defined in claim 17 wherein the inbound threads:
filter the acquired CIRs; and
store the filtered CIRs in the call pool.

19. A server as defined in claim 17 further comprising:
a database; and
an output daemon associated with one or more outbound threads to acquire CIRs from the call pool and store the CIRs in the database.

20. An apparatus for reporting called telephone number usage to a computer user at a computer interface, the apparatus comprising:
means for acquiring one or more call information records (CIRs), the one or more CIRs being produced from signaling data associated with one or more telephone calls that involve the called telephone number;
means for identifying, via the signaling data, a completed call made from a calling number to the called telephone number when a dropped call duration counter exceeds a dropped call threshold duration;
means for identifying, via the signaling data, a lost call made from the calling number to the called telephone number when the dropped call duration counter is below the dropped call threshold duration and the calling number fails to retry the call within a retry threshold duration;
means for generating a report, that reports usage of the called telephone number, from the one or more CIRs; and
means for transferring the report to the computer user's computer interface.

21. A computer readable medium comprising computer executable instructions to:
identify, via signaling data, a completed call made from a calling number to a called telephone number when a dropped call duration counter exceeds a dropped call threshold duration;
identify, via the signaling data, a lost call made from the calling number to the called telephone number when the dropped call counter is below the dropped call threshold duration and the calling number fails to retry the call within a retry threshold duration;
generate a report, that reports usage of the called telephone number, from one or more call information records (CIRs) wherein the one or more CIRs are produced from the signaling data associated with one or more telephone calls that involve the called telephone number; and
transfer the report to a computer user's computer interface.

22. A computer readable medium as defined in claim 21 wherein the computer user's computer interface comprises a web browser.

23. A computer readable medium as defined in claim 21 further comprising computer executable instructions to store the one or more CIRs in a database.

24. A computer readable medium as defined in claim 21 further comprising computer executable instructions to:
filter the one or more CIRs; and
store the filtered CIRs in a database.

25. A computer readable medium as defined in claim 21 further comprising computer executable instructions to notify the user that the report has been generated.

26. A computer readable medium comprising computer executable instructions to:
collect signaling protocol data for one or more completed telephone calls that involve a called toll free telephone number;
decode the signaling protocol data;
identify, via the signaling protocol data, a completed call made from a calling number to the called telephone number when a dropped call duration counter exceeds a dropped call threshold duration;
identify, via the signaling protocol data, a lost call made from the calling number to the called telephone number when the dropped call counter is below the dropped call threshold duration and the calling number fails to retry the call within a retry threshold duration;
produce one or more call information records (CIRs) from the decoded signaling data;
generate a report, that reports usage of the called toll free telephone number, from the one or more CIRs; and
transfer the report to a computer interface.

* * * * *